United States Patent [19]

Keller

[11] Patent Number: 4,630,748
[45] Date of Patent: Dec. 23, 1986

[54] ANTI-SIPHON FUEL FILLER ASSEMBLY

[76] Inventor: Russell D. Keller, 149 N. Lotus Beach Dr., Portland, Oreg. 97217

[21] Appl. No.: 763,475

[22] Filed: Aug. 7, 1985

[51] Int. Cl.$^4$ .......................................... B65D 25/02
[52] U.S. Cl. ................................ 220/86 AT; 220/85 F
[58] Field of Search ........................ 220/86 AT, 85 F

[56] References Cited

U.S. PATENT DOCUMENTS

| | | | |
|---|---|---|---|
| 1,787,250 | 12/1930 | Hughes | 220/86 AT |
| 1,808,245 | 6/1931 | Middelton | 220/86 AT |
| 1,813,554 | 7/1931 | Wickline | 220/86 AT |
| 1,862,016 | 6/1932 | Houck, Sr. | 220/86 AT |
| 1,971,714 | 8/1934 | Harkness | 220/86 AT |
| 2,006,748 | 7/1935 | Ritz-Woller | 220/86 AT |
| 2,041,070 | 5/1936 | Jones | 220/86 AT |
| 3,002,649 | 10/1961 | Turley | 220/86 AT |
| 3,552,435 | 1/1971 | Andersson et al. | 220/85 F X |

Primary Examiner—Steven M. Pollard
Attorney, Agent, or Firm—Klarquist, Sparkman, Campbell, Leigh & Whinston

[57] ABSTRACT

An anti-siphon fuel filler assembly having restriction means therein for preventing unauthorized fuel removal is provided. In addition, back pressure relief means are provided for preventing the premature deactivation of automatic fuel dispensing systems caused by reverse fuel flow. The back pressure relief means includes a plurality of side openings and tabs extending outwardly from the edges of such side openings to deflect fuel out of the side openings when such fuel splashes upward from the restriction means. The invention may be used as an insert, fixedly positioned within an existing filler neck tube. In the alternative, the invention may be an anti-siphon filler neck tube used as an original equipment component for new vehicles, replacing the conventional filler neck tube.

24 Claims, 7 Drawing Figures

U.S. Patent    Dec. 23, 1986    Sheet 1 of 2    4,630,748
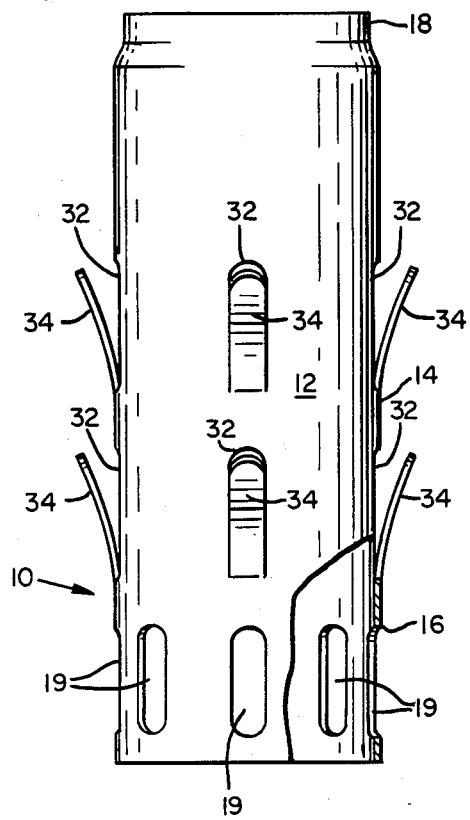
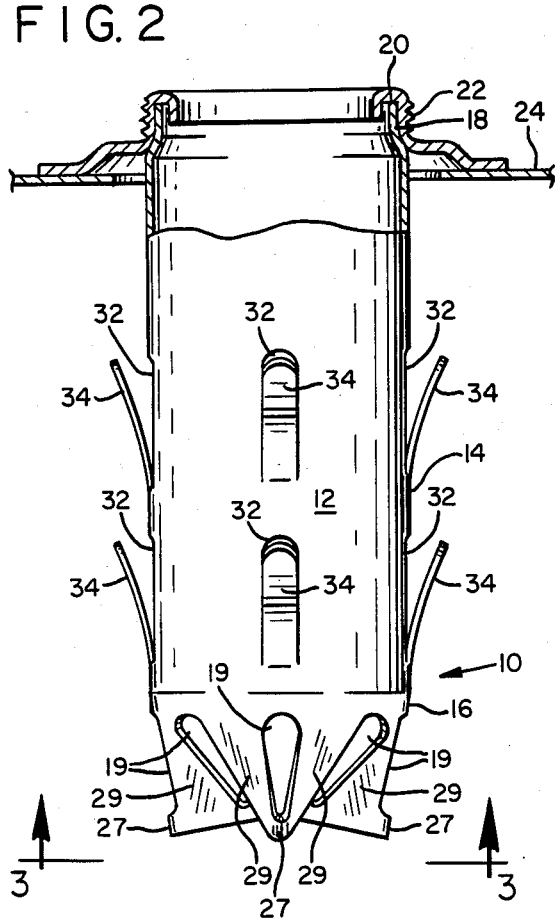
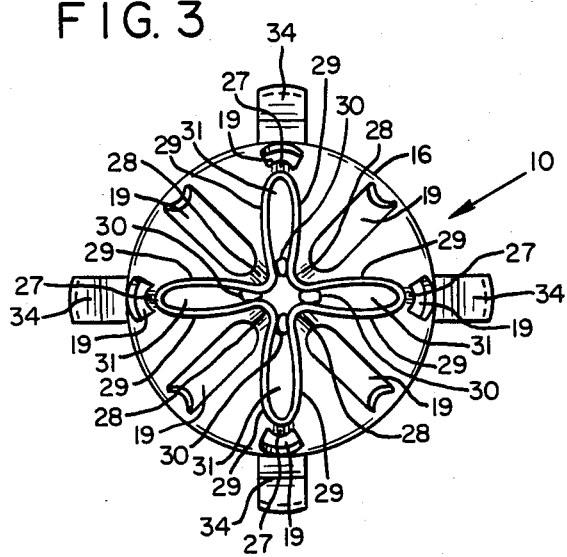

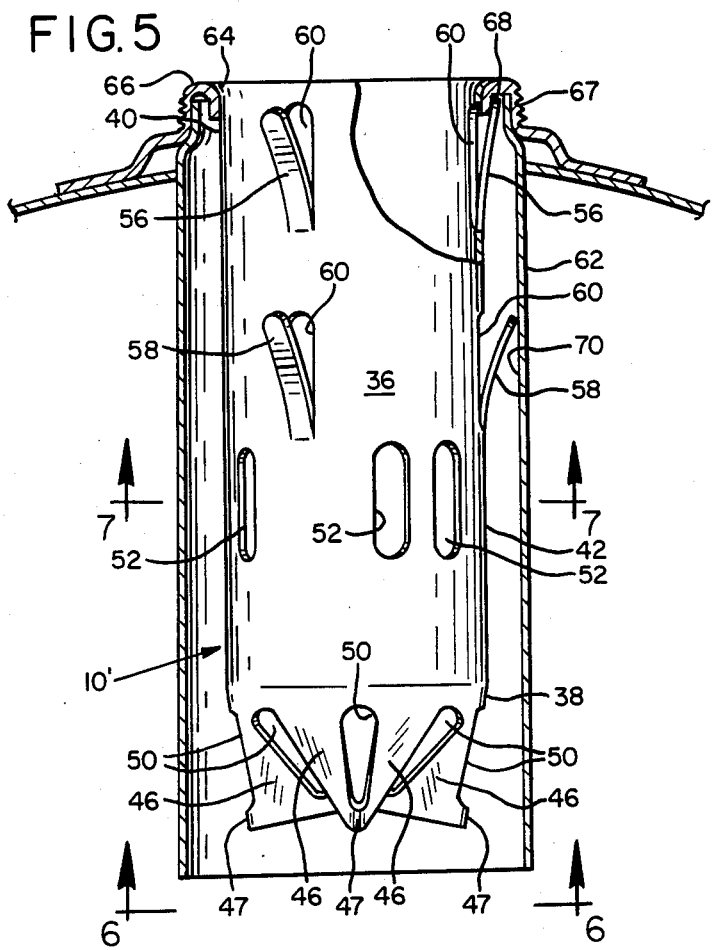

ANTI-SIPHON FUEL FILLER ASSEMBLY

BACKGROUND OF THE INVENTION

The present invention generally relates to anti-siphon fuel filler systems. More particularly, the invention relates to an anti-siphon fuel filler assembly having restriction means for preventing unauthorized fuel removal and means for preventing the premature deactivation of automatic fuel dispensing systems caused by reverse fuel flow.

The increasing cost of petroleum products has created a corresponding increase in fuel theft. Fuel theft is especially widespread in the trucking industry. To remove fuel from a truck or other vehicle, a siphon hose is commonly inserted through the filler neck tube into the fuel tank. The application of suction through the hose permits the withdrawal of fuel.

Various devices have been created which prevent access to the interior of the fuel tank. Many such devices use lock mechanisms. However, these devices are easily opened and generally ineffective. Furthermore, most require the use of a key. Loss of the key presents significant problems, especially if the vehicle operator has a delivery or travel deadline. Also, lock mechanisms frequently malfunction during cold and inclement weather. A need therefore exists for an improved anti-siphon system which prevents fuel theft in a simple and efficient manner, while avoiding the use of keys or lock mechanisms.

SUMMARY OF THE INVENTION

In accordance with the present invention, an anti-siphon filler neck tube is provided. The inner end of the filler neck tube has restriction means for preventing the insertion of siphon tubes or the like into the fuel tank. However, the restriction means is constructed to permit fuel flow therethrough. The filler neck tube also has back pressure relief means including a plurality of openings in the side walls of the tube, each opening havinq an adjacent, outwardly-extending tab. Any fuel prematurely flowing upward in the filler neck tube will exit through the openings, being outwardly deflected by the tabs. This arrangement prevents the premature activation of pressure sensors in the fuel filler nozzle during filling of the tank. The filler neck tube, as described herein, may be used as an original equipment component in new motor vehicles. The invention may also be used as an insert in the filler neck tubes of existing motor vehicle fuel systems.

It is therefore one object of the present invention to provide an anti-siphon fuel filler assembly of simple and economical construction.

Another object of the present invention is to provide an anti-siphon fuel filler assembly capable of withstanding the application of significant amounts of external force thereto.

An additional object of the invention is to provide an anti-siphon fuel filler assembly having restriction means therein to prevent the insertion of siphon tubes or the like into the interior of a fuel tank.

Still another object of the present invention is to provide an anti-siphon fuel filler assembly having back pressure relief means for preventing the premature deactivation of automatic fuel dispensing systems.

A further object of the present invention is to provide an anti-siphon fuel filler assembly usable as original equipment in the fuel system of a new motor vehicle.

A still further object of the invention is to provide an anti-siphon fuel filler assembly adaptable for use in the existing fuel system of a motor vehicle.

DESCRIPTION OF THE DRAWINGS

Other objects and advantages of the present invention will be apparent from the following detailed description and the attached drawings of which:

FIG. 1 is a side view of an anti-siphon filler neck tube in accordance with one embodiment of the present invention prior to the formation of the restriction means therein;

FIG. 2 is a side view of the embodiment of FIG. 1 having the restriction means formed therein, shown inserted in a vehicle fuel tank;

FIG. 3 is an end view taken along lines 3—3 of FIG. 2;

FIG. 4 is a side view of another embodiment of the present invention in the form of an anti-siphon insert for a filler neck tube prior to the formation of the restriction means therein;

FIG. 5 is a side view of the embodiment of FIG. 4 having the restriction means formed therein, shown inserted in the existing filler neck tube of a vehicle fuel tank;

FIG. 6 is an end view taken along lines 6—6 of FIG. 5;

FIG. 7 is a vertical section view taken along lines 7—7 of FIG. 5.

DESCRIPTION OF PREFERRED EMBODIMENTS

The present invention provides an effective and efficient apparatus for preventing fuel theft. Shown in Figs. 1-3 is an anti-siphon filler neck tube 10 in accordance with the present invention designed for placement in the fuel system of a new motor vehicle as original equipment. With reference to FIG. 1, a filler neck tube 12 substantially circular in cross section is shown having a center body portion 14 and two opposite ends 16, 18. The lower end 16 of the filler neck tube 12 has a plurality of fuel flow outlets 19. The upper end 18 of the filler neck tube 12 has a smaller diameter in comparison with center body portion 14. It is sized for placement in the pocket 20 of the filler neck 22 of a fuel tank 24 shown in FIG. 2.

To prevent the insertion of a siphon hose or the like through the filler neck tube 12 and into the fuel tank 24, the end 16 shown in FIG. 1 is crimped inward. FIGS. 2 and 3 show end 16 after crimping has been completed. In FIG. 3, four inwardly projecting folds 28, each having two sides 29 are formed by the crimping of end 16. The adjacent sides of the folds 28 are joined at four junctions 27 to provide four elongated, flattened outlet openings 31. After crimping, the fuel flow outlets 19 are positioned at the folds 28 and at the junctions 27 as shown in FIG. 3. To permanently maintain the crimped configuration of end 16 of the filler neck tube 12, reinforcing welds 30 are placed as shown.

The crimping of end 16 prevents the passage of a siphon hose or the like into the fuel tank 24. However, the fuel flow outlets 19 in the end 16 permit the introduction of fuel into the tank at a fast and even rate. In addition, outlet openings 31 also facilitate the flow of fuel.

As noted above, FIG. 2 shows the filler neck tube 12 fixedly positioned in the pocket 20 of the filler neck 22 of a fuel tank 24. In a preferred form of the present invention, the upper end 18 of filler neck tube 12 is adhesively bonded in the pocket 20 of the filler neck 22 using a methacrylate ester adhesive. However, other affixation methods known in the art such as welding may also be used.

As indicated in FIGS. 1 and 2, the center body portion 14 of the filler neck tube 12 contains a plurality of side openings 32. To form each of the side openings 32, tabs 34 are cut in the center body portion 14 of the filler neck tube 12 and bent outward. The tabs 34 each consist of an elongate member extending longitudinally along the axis of the filler neck tube 12 and upward from the bottom of its associated opening 32 at an acute angle to the side of tube 12. Each of the tabs 34 and its corresponding opening 32 function to reduce fuel "back pressure." During filling, modern fuel delivery systems incorporate tank nozzles having pressure sensors. When the tank is nearly filled, the fuel begins to rise, coming closer to the nozzle. When fuel reaches the nozzle, a pressure sensor is triggered, causing the flow of fuel from the nozzle to stop. The term "back pressure" refers to increases in liquid pressure within the filler neck tube 12 caused by fuel rising therein. To avoid problems resulting from fuel splashing upward from the crimped end 16 of filler neck tube 12 and prematurely activating the nozzle pressure sensors described above, the arrangement of openings 32 and tabs 34 is provided. Any fuel prematurely moving upward in the filler neck tube 12 will pass through the openings 32, being deflected by the tabs 34 out of the filler neck tube 12 and back into the fuel tank. Thus, the problem of premature pressure sensor activation is avoided.

In addition to providing means for outwardly deflecting any reverse flow of fuel, the tabs 34 also function to block the passage of a siphon tube or the like through the openings 32. With the tabs 34 in position as shown in FIGS. 1-3, there is insufficient room for the passage of a siphon hose through the openings 32.

In the embodiment of FIGS. 1-3 described above, there are preferably eight fuel flow openings 19, eight openings 32, and eight tabs 34.

A second embodiment of the present invention 10' is shown in FIGS. 4-7. This embodiment is primarily designed as an insert for placement in the existing filler neck tube of a motor vehicle fuel tank. With reference to FIG. 4, a filler neck tube insert 36 is provided having lower end 38, upper end 40 and a center body portion 42 substantially circular in cross section. The lower end 38 is crimped to form a restriction in the insert 36, as shown in FIGS. 5-6. Crimping of the end 38 is accomplished in the same manner and for the same purpose as described above in FIGS. 2 and 3 of the first embodiment. After crimping, the end 38 has inwardly directed folds 44 having sides 46 which are joined at junctions 47 (FIG. 6). The crimped configuration of end 38 is maintained using reinforcing welds 48.

Referring back to FIG. 4, also provided is a first annular row of fuel flow outlets 50 and second annular row of fuel flow outlets 52 spaced upward from the first row. The first row of fuel flow outlets 50 becomes part of the crimped configuration of end 38 (FIGS. 5 and 6). The fuel flow outlets 50 permit the flow of fuel downward through the crimped end 38. The second row of fuel flow outlets 52 permits flow through the sides of the insert 36. In addition, other outlet openings 54 are formed during the crimping of end 38 (FIG. 6) which further enhance fuel flow from the insert 36 into the fuel tank.

The insert 36 has a first annular row of outwardly directed tabs 56 and second annular row of outwardly directed tabs 58 spaced downward from the first row. Each of the tabs 56, 58 is directly adjacent a side opening 60. The tabs 56, 58 are formed in the same manner as that described above for tabs 34 of the first embodiment.

In FIG. 5, the insert 36 is positioned in an existing filler neck tube 62. To retain the insert 36 in the existing filler neck tube 62, an outwardly flaired portion 64 at upper end 40 of insert 36 has been provided. The flaired portion 64 engages the edge 66 of the filler neck 67. The tabs 56, 58 also help retain the insert 36 in position within filler neck tube 62. Specifically, the tabs 56 are engaged in the filler neck pocket 68 in the filler neck 67 to prevent removal of the insert 36. Tabs 58 frictionally engage the inner wall 70 of the existing filler neck tube 62 to limit lateral movement of the insert 36. The tabs 56, 58 and corresponding openings 60 also control fuel back pressure in the same manner as tabs 34 and openings 32 in the embodiment of FIGS. 1-3.

In the embodiment of FIGS. 4-7 described above, there are preferably four inwardly projecting folds 44, eight fuel flow openings 50, six fuel flow openings 52, three tabs 56, three tabs 58, and six openings 60.

The present invention, in the embodiments described above, is of unitary construction and inexpensive to manufacture. It is constructed of aluminum, stainless steel or other durable material. In addition, the invention may be varied in size and dimension to accommodate fuel systems in different vehicles. However, the basic structural features noted above will remain the same.

It will be obvious to those having ordinary skill in the art that many changes may be made in the invention as described above. For example, the number of tabs, fuel flow openings, and other structural characteristics may be modified and still remain within the scope of the present invention. Therefore, the scope of the invention should be determined by the following claims.

I claim:

1. An anti-siphon fuel filler assembly for placement in a fuel tank comprising:
    tube means adapted to be positioned in said fuel tank for allowing fuel to flow therethrough into said tank;
    restriction means in said tube means for preventing the insertion of a siphon hose into said tank;
    a plurality of openings in the side walls of said tube means; and
    deflection means for outwardly directing any reverse flow of fuel in said tube means, said deflection means including a plurality of tabs, each tab being positioned adjacent one of said openings, and projecting outwardly therefrom.

2. The anti-siphon fuel filler assembly of claim 1 wherein each of said tabs extends upward from the bottom of its associated opening at an acute angle to the side of said tube means.

3. The anti-siphon fuel filler assembly of claim 1 wherein each of said tabs comprises an elongate member extending longitudinally along the axis of said tube means.

4. The anti-siphon fuel filler assembly of claim 1 wherein said restriction means comprises an end portion of said tube means bent inwardly at a plurality of positions to provide a plurality of inwardly projecting folds in said end portion.

5. The anti-siphon fuel filler assembly of claim 4 wherein said restriction means has a plurality of openings for allowing the passage of fuel therethrough into said tank.

6. The anti-siphon fuel filler assembly of claim 5 wherein said openings are positioned adjacent said folds and at the junctions between said folds.

7. The anti-siphon fuel filler assembly of claim 4 wherein said folds are bonded together.

8. The anti-siphon fuel filler assembly of claim 7 wherein said folds are bonded together using welds.

9. The anti-siphon fuel filler assembly of claim 1 wherein said assembly is of unitary construction.

10. The anti-siphon fuel filler assembly of claim 1 wherein said assembly is manufactured from a metal selected from the group consisting of aluminum and stainless steel.

11. An anti-siphon fuel filler insert for placement in the filler neck tube of a fuel tank comprising:
   insert tube means adapted to be positioned in said filler neck tube for allowing fuel to flow therethrough into said tank;
   restriction means in said insert tube means for preventing the insertion of a siphon hose into said tank;
   a plurality of openings in the side walls of said insert tube means; and
   deflection means for outwardly directing any reverse flow of fuel in said insert tube means, said deflection means including a plurality of tabs, each tab being positioned adjacent one of said openings, and projecting outwardly therefrom.

12. The anti-siphon fuel filler insert of claim 11 wherein said plurality of openings in said side walls comprises a first annular row of openings and a second annular row of openings.

13. The anti-siphon fuel filler insert of claim 12 wherein said plurality of tabs comprises a first annular row of tabs adjacent said first annular row of openings and projecting outwardly therefrom, and a second annular row of tabs adjacent said second annular row of openings and projecting outwardly therefrom.

14. The anit-siphon fuel filler insert of claim 13 wherein said first annular row of tabs is positioned within the filler neck pocket of the filler neck of said tank to prevent the removal of said insert from said filler neck tube.

15. The anti-siphon fuel filler insert of claim 14 wherein said second annular row of tabs frictionally engages the interior walls of said filler neck tube to prevent lateral movement of said insert in said filler neck tube.

16. The anti-siphon fuel filler insert of claim 11 wherein said restriction means comprises an end portion of said insert tube means bent inwardly at a plurality of positions to provide a plurality of inwardly projecting folds in said end portion.

17. The anti-siphon fuel filler insert of claim 16 wherein said restriction means has a plurality of openings for allowing the passage of fuel therethrough into said tank.

18. The anti-siphon fuel filler insert of claim 17 wherein said openings are positioned adjacent said folds and at the junctions between said folds.

19. The anti-siphon fuel filler insert of claim 16 wherein said folds are bonded together.

20. The anti-siphon fuel filler insert of claim 19 wherein said folds are bonded together using welds.

21. The anti-siphon fuel filler insert of claim 11 comprising a second plurality of openings positioned between said deflection means and said restriction means.

22. The anti-siphon fuel filler assembly of claim 11 wherein the upper end of said insert tube means has an outwardly flaired portion thereon for engagement with said filler neck to prevent said insert from being pushed downward in said filler neck tube.

23. The anti-siphon fuel filler insert of claim 11 wherein said insert is of unitary construction.

24. The anti-siphon fuel filler insert of claim 23 wherein said insert is manufactured from a metal selected from the group consisting of aluminum and stainless steel.

* * * * *

UNITED STATES PATENT AND TRADEMARK OFFICE
CERTIFICATE OF CORRECTION

PATENT NO. : 4,630,748
DATED : December 23, 1986
INVENTOR(S) : RUSSELL D. KELLER It is certified that error appears in the above-identified patent and that said Letters Patent is hereby corrected as shown below:

In the Specification

Column 4, line 12, "flaired" should be --flared--.

Column 4, line 14, "flaired" should be --flared--.

In the Claims

Claim 22, column 6, line 34, "flaired" should be --flared--.

Signed and Sealed this

Twenty-fourth Day of March, 1987

Attest:

DONALD J. QUIGG

Attesting Officer   Commissioner of Patents and Trademarks